(12) United States Patent
Rustomji et al.

(10) Patent No.: US 11,088,396 B2
(45) Date of Patent: Aug. 10, 2021

(54) ELECTROLYTE FORMULATIONS FOR ELECTROCHEMICAL DEVICE

(71) Applicant: SOUTH 8 TECHNOLOGIES, INC., San Diego, CA (US)

(72) Inventors: Cyrus Sam Rustomji, La Jolla, CA (US); Jungwoo Lee, San Diego, CA (US); James Royer, San Diego, CA (US)

(73) Assignee: SOUTH 8 TECHNOLOGIES, INC., San Diego, CA (US)

( * ) Notice: Subject to any disclaimer, the term of this patent is extended or adjusted under 35 U.S.C. 154(b) by 0 days.

(21) Appl. No.: 17/006,850

(22) Filed: Aug. 30, 2020

(65) Prior Publication Data

US 2021/0098829 A1    Apr. 1, 2021

Related U.S. Application Data

(60) Provisional application No. 62/911,505, filed on Oct. 7, 2019, provisional application No. 62/908,515, filed on Sep. 30, 2019, provisional application No. 62/911,508, filed on Oct. 7, 2019.

(51) Int. Cl.
| | |
|---|---|
| *H01M 10/0567* | (2010.01) |
| *H01M 4/38* | (2006.01) |
| *H01M 4/505* | (2010.01) |
| *H01M 4/525* | (2010.01) |
| *H01M 10/04* | (2006.01) |
| *H01M 10/0568* | (2010.01) |
| *H01M 10/0569* | (2010.01) |
| *H01G 11/60* | (2013.01) |
| *H01G 11/32* | (2013.01) |
| *H01G 11/62* | (2013.01) |
| *H01G 11/46* | (2013.01) |
| *H01G 11/64* | (2013.01) |

(52) U.S. Cl.
CPC ....... *H01M 10/0567* (2013.01); *H01M 4/382* (2013.01); *H01M 4/505* (2013.01); *H01M 4/525* (2013.01); *H01M 10/0422* (2013.01); *H01M 10/0568* (2013.01); *H01M 10/0569* (2013.01); *H01G 11/32* (2013.01); *H01G 11/46* (2013.01); *H01G 11/60* (2013.01); *H01G 11/62* (2013.01); *H01G 11/64* (2013.01); *H01M 2300/0034* (2013.01)

(58) Field of Classification Search
None
See application file for complete search history.

(56) References Cited

U.S. PATENT DOCUMENTS

| | | |
|---|---|---|
| 2010/0047695 A1 | 2/2010 | Smart |
| 2013/0189591 A1 | 7/2013 | Nishimura |
| 2016/0261005 A1 | 9/2016 | Rustomji et al. |
| 2018/0068803 A1* | 3/2018 | Brambilla ............... H01G 11/56 |
| 2018/0375156 A1 | 12/2018 | Zhamu et al. |

OTHER PUBLICATIONS

International Search Report dated Nov. 30, 2020 for PCT/us2020/048660.

* cited by examiner

*Primary Examiner* — Laura Weiner
(74) *Attorney, Agent, or Firm* — Manuel de la Cerra

(57) ABSTRACT

A battery device is disclosed that includes an ionically conducting electrolyte comprising a mixture of a compressed gas solvent and one or more solid or liquid salts, wherein the compressed gas solvent comprises at least a first component that has a vapor pressure above 100 kPa at a room temperature of 293.15 K. The device also includes a housing enclosing the ionically conducting electrolyte under a pressurized condition to maintain the compressed gas solvent at a pressure higher than 100 kPa at a room temperature of 293.15 K. The device also includes at least two conducting electrodes in contact with the ionically conducting electrolyte.

6 Claims, 7 Drawing Sheets

ELECTROLYTE FORMULATIONS FOR ELECTROCHEMICAL DEVICE

1.0 CROSS-REFERENCE TO RELATED APPLICATIONS

The present application claims priority to U.S. Provisional Application 62/908,515, filed Sep. 30, 2019; to U.S. Provisional Application 62/911,505, filed Oct. 7, 2019; and to U.S. Provisional Application 62/911,508, filed Oct. 7, 2019. Each of these applications is incorporated by reference in their entirety.

This application is also related to U.S. application Ser. No. 16/666,155, filed Oct. 28, 2019; to PCT/US2019/032413, filed May 15, 2019; to U.S. Provisional Application No. 62/673,792, filed May 18, 2018; to U.S. application Ser. No. 16/666,131, filed Oct. 28, 2019; to PCT/US2019/032414, filed May 15, 2019; to U.S. Provisional Application No. 62/673,752, filed May 18, 2019; to U.S. Provisional Application No. 62/749,046, filed Oct. 22, 2018; to U.S. Provisional Application No. 61/972,101, filed Mar. 28, 2014; to U.S. Provisional Application No. 61/905,057, filed Nov. 15, 2013; to PCT/US14/066015, filed Nov. 17, 2014; to U.S. application Ser. No. 15/036,763, filed May 13, 2016; to U.S. application Ser. No. 16/793,190, filed Feb. 18, 2020; to PCT/US17/29821, filed Apr. 27, 2017; to U.S. application Ser. No. 16/305,034, filed Nov. 28, 2018; to U.S. Provisional Application No. 62/342,838, filed May 27, 2016; to PCT/US2020/026086, filed Apr. 1, 2020; and to U.S. Provisional Application No. 62/800,955, filed Feb. 4, 2019. The contents of each of these applications are hereby incorporated by reference in their entirety.

2.0 STATEMENT REGARDING FEDERALLY SPONSORED R&D

This invention was made with government support under grant 1831087 awarded by the National Science Foundation (NSF). The government has certain rights in the invention.

3.0 FIELD OF THE INVENTION

Embodiments of the invention relate to compositions and to chemical formulations of electrolytes for use in electrochemical energy devices, such as batteries and electrochemical capacitors. Devices using the compositions and methods of use of the compositions are also provided.

4.0 BACKGROUND

Electrochemical energy storage devices, such as batteries and double layer capacitors, utilize an ionically conducting electrolyte solution to carry charge between positive and negative electrodes. Typically, these electrolytes are liquid at a standard room temperature of +20 C and at a standard pressure (approximately 1.01325 bar). The electrolyte solutions use a mixture of some amount of solvent and salt and additional components, or additives, for improved electrochemical stability of the device. Common component additives include vinyl carbonate, fluoroethylene carbonate, lithium bis(oxalato)borate, and propane sultone, among others. Such additives help in surface modification of electrodes, safety aspects or other useful ways. Solubility of salts is generally a function of the primary solvent, rather than a function of the additives. Further, the cell voltage is commonly limited by all electrolyte components, but most critically by the solvent and by any additives. Lastly, electrolyte flammability is commonly a safety concern related to the operation of lithium batteries.

5.0 SUMMARY

Embodiments of the present disclosure relate to chemical formulations, electrolyte compositions, electrochemical devices of use thereof, and methods of use thereof. Some disclosed embodiments relate to novel formulations for electrolytes comprising a liquefied gas solvent.

One embodiment relates to a rechargeable electrochemical device that includes an ionically conducting electrolyte comprising one or more liquefied gas solvents, one or more salts, and one or more additives; a housing enclosing the ionically conducting electrolyte is structured to provide a pressurized condition to the liquefied gas solvent; and at least two conducting electrodes in contact with the ionically conducting electrolyte.

In some embodiments, the liquefied gas solvent is capable of being placed under a compressive pressure equal to, or greater than, the liquefied gas solvent's vapor pressure at a temperature when the compressive pressure is applied, thereby keeping the liquefied gas solvent in a liquid phase. In some embodiments, the liquefied gas solvent has a vapor pressure above an atmospheric pressure of 100 kPa at a room temperature of 293.15 K.

In some embodiments, the liquefied gas solvent comprises one or more materials selected from the group consisting of: fluoromethane, difluoromethane, sulfuryl fluoride, thionyl fluoride, carbon dioxide, 1,1-difluoroethane, chloromethane, nitrous oxide, dimethyl ether, nitrogen, argon, and any combination thereof. In some embodiments, the liquefied gas solvent comprises fluoromethane and carbon dioxide. In some embodiments, the liquefied gas solvent comprises fluoromethane and sulfuryl fluoride. In some embodiments, the liquefied gas solvent comprises fluoromethane and difluoromethane. In some embodiments, the liquefied gas solvent comprises fluoromethane, difluoromethane, and carbon dioxide. In some embodiments, the liquefied gas solvent comprises fluoromethane, sulfuryl fluoride, and carbon dioxide. In some embodiments, the liquefied gas solvent comprises fluoromethane and chloromethane. In some embodiments, the ratio of sulfuryl fluoride to fluoromethane is lower than 1:9. In some embodiments, the ratio of sulfuryl fluoride to carbon dioxide is about 1:1.

In some embodiments, the one or more additives are selected from a group consisting of an organophosphate compound. In some embodiments, the one or more additives comprises trimethyl phosphate. In another embodiment, the one or more additives comprises triethyl phosphate. In another embodiment, the one or more additives is tripropyl phosphate. In another embodiment, the one or more additives is dimethyl ethyl phosphate.

In some embodiments, the rechargeable electrochemical device further comprises one or more lithium salts. In some embodiments, the molar ratio of the one or more additives to the one or more lithium salts is about 0.01, 0.2, 0.5, 0.7, 1, 1.2, 1.4, 1.6, 1.8, 2, 2.2, 2.4, 2.6, 3, 4, 5, 6, 7, 8, 9 or 10.

Another embodiment relates to a rechargeable lithium ion or a lithium metal battery. The rechargeable lithium battery may include an ionically conducting electrolyte. The ionically conducting electrolyte may comprise a liquefied gas solvent. In some embodiments, the ionically conducting electrolyte may further comprise one or more additives, selected from the group consisting of an organophosphate compound. In some embodiments, the rechargeable lithium ion battery may also include a housing that encloses two conducting electrodes and the ionically conducting electrolyte. In some embodiments, the liquefied gas solvent has a vapor pressure above an atmospheric pressure of 100 kPa at a room temperature of 293.15 K. In some such embodiments, the liquefied gas solvent may be capable of being placed under a compressive pressure equal to, or greater than, the liquefied gas solvent's vapor pressure at a temperature when the compressive pressure is applied, thereby keeping the liquefied gas solvent in a liquid phase.

Alternative or additional embodiments described herein provide an electrolyte composition comprising one or more of the features of the foregoing description or of any description elsewhere herein.

Alternative or additional embodiments described herein provide a device comprising one or more of the features of the foregoing description or of any description elsewhere herein.

Alternative or additional embodiments described herein provide a method of using the electrolyte composition or device comprising one or more of the features of the foregoing description or of any description elsewhere herein.

Additional aspects, alternatives and variations, as would be apparent to persons of skill in the art, are also disclosed herein and are specifically contemplated as included as part of the invention. The invention is set forth only in the claims as allowed by the patent office in this or related applications, and the following summary descriptions of certain examples are not in any way to limit, define or otherwise establish the scope of legal protection.

6.0 BRIEF DESCRIPTION OF THE DRAWINGS

Figure 4:
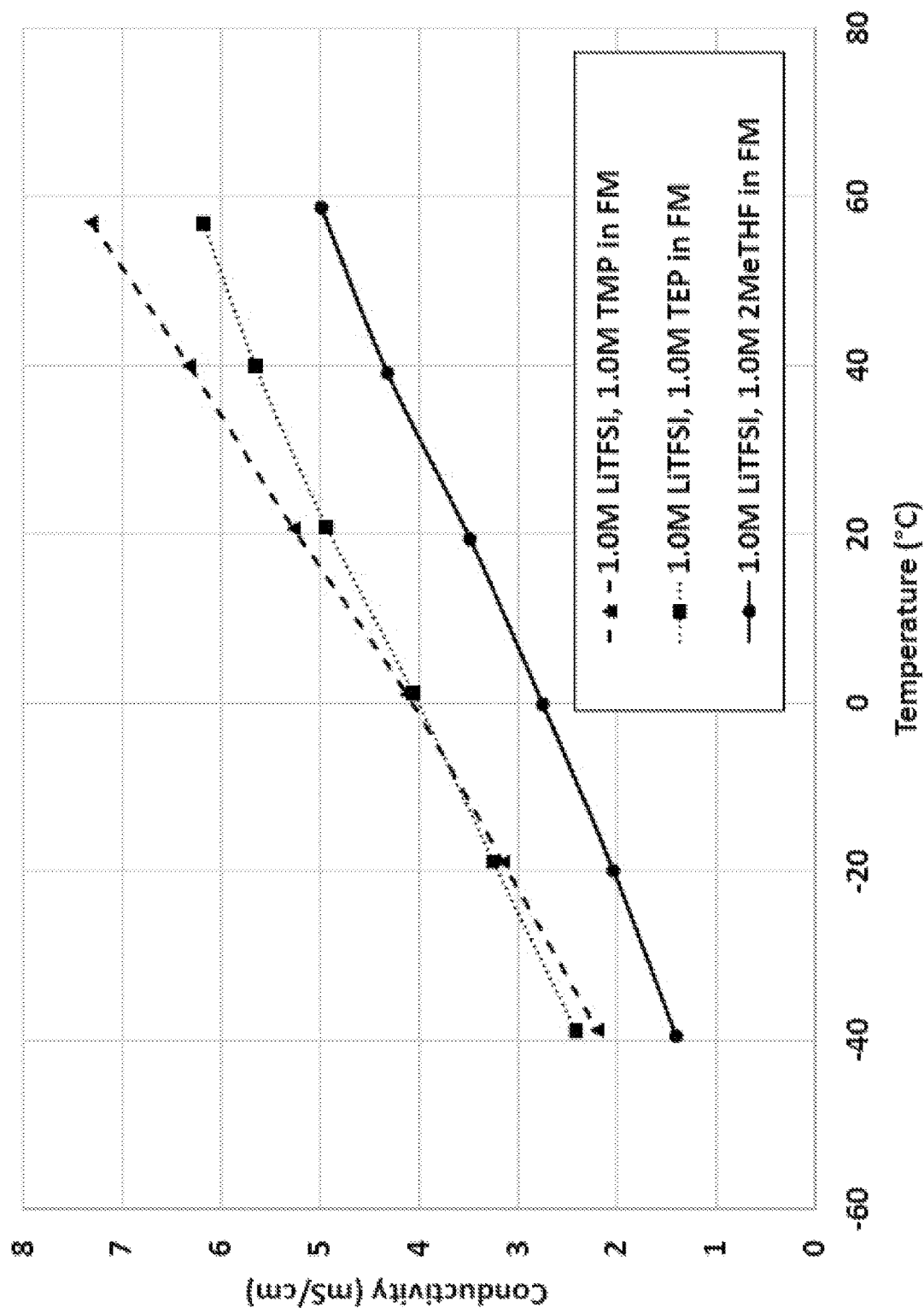

FIG. 4 illustrates the electrolytic conductivity of various liquefied gas electrolyte solutions, including electrolyte solution 1 (1.0 M LiTFSI and 1.0 M triethyl phosphate (TEP) in $CH_3F$ (FM)), electrolyte solution 2 (1.0 M LiTFSI and 1.0 M trimethyl phosphate (TMP) in $CH_3F$ (FM)) and electrolyte solution 3 (1.0 M LiTFSI and 1.0 M 2-methyl tetrahydrofuran (2MeTHF) in $CH_3F$ (FM)).

Figure 5:
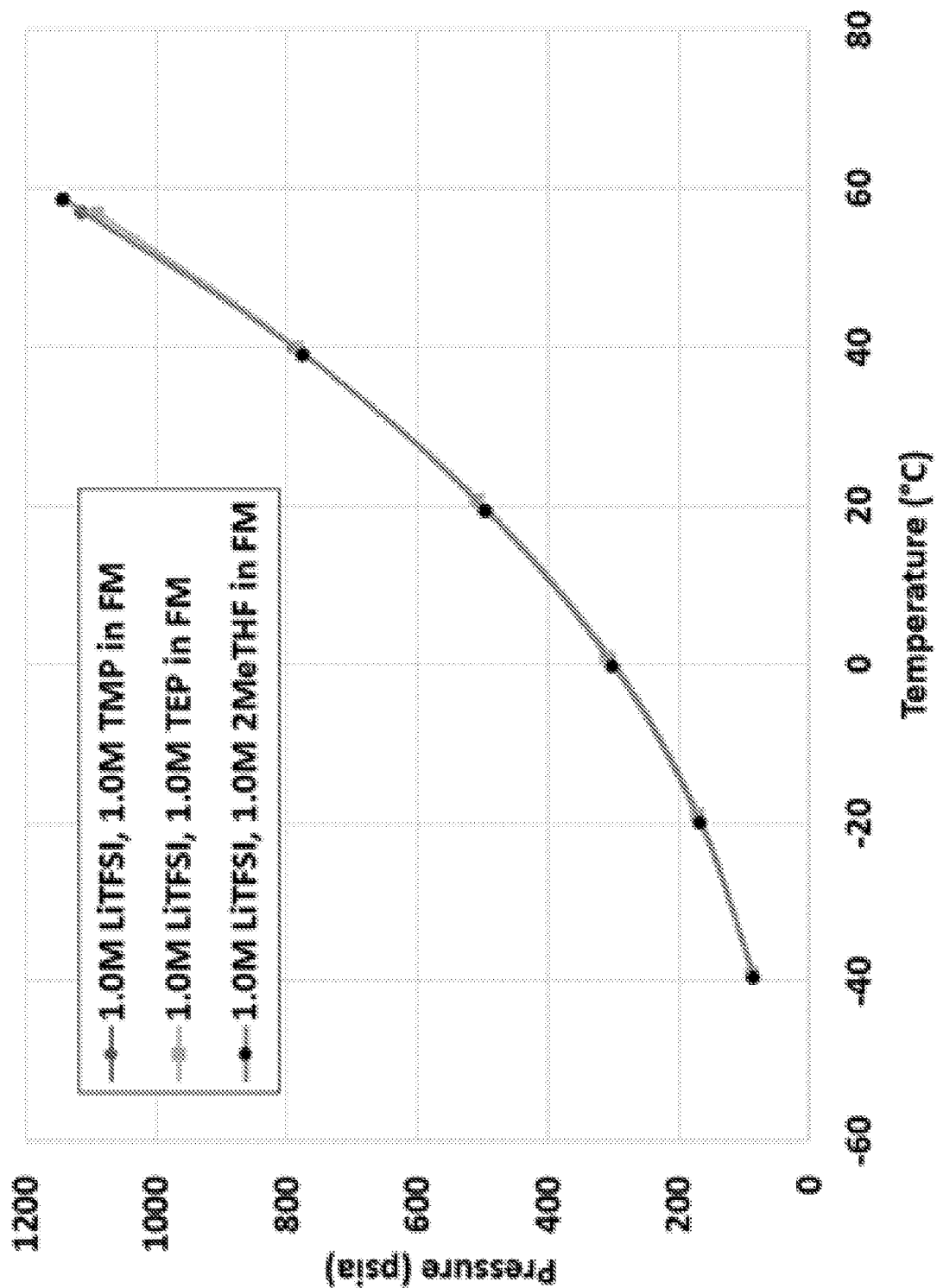

FIG. 5 illustrates the electrolyte pressure of various liquefied gas electrolyte solutions, including electrolyte solution 1 (1.0 M LiTFSI and 1.0 M triethyl phosphate (TEP) in $CH_3F$ (FM)), electrolyte solution 2 (1.0 M LiTFSI and 1.0 M trimethyl phosphate (TMP) in $CH_3F$ (FM)) and electrolyte solution 3 (1.0 M LiTFSI and 1.0 M 2-methyl tetrahydrofuran (2MeTHF) in $CH_3F$ (FM)).

Figure 6:
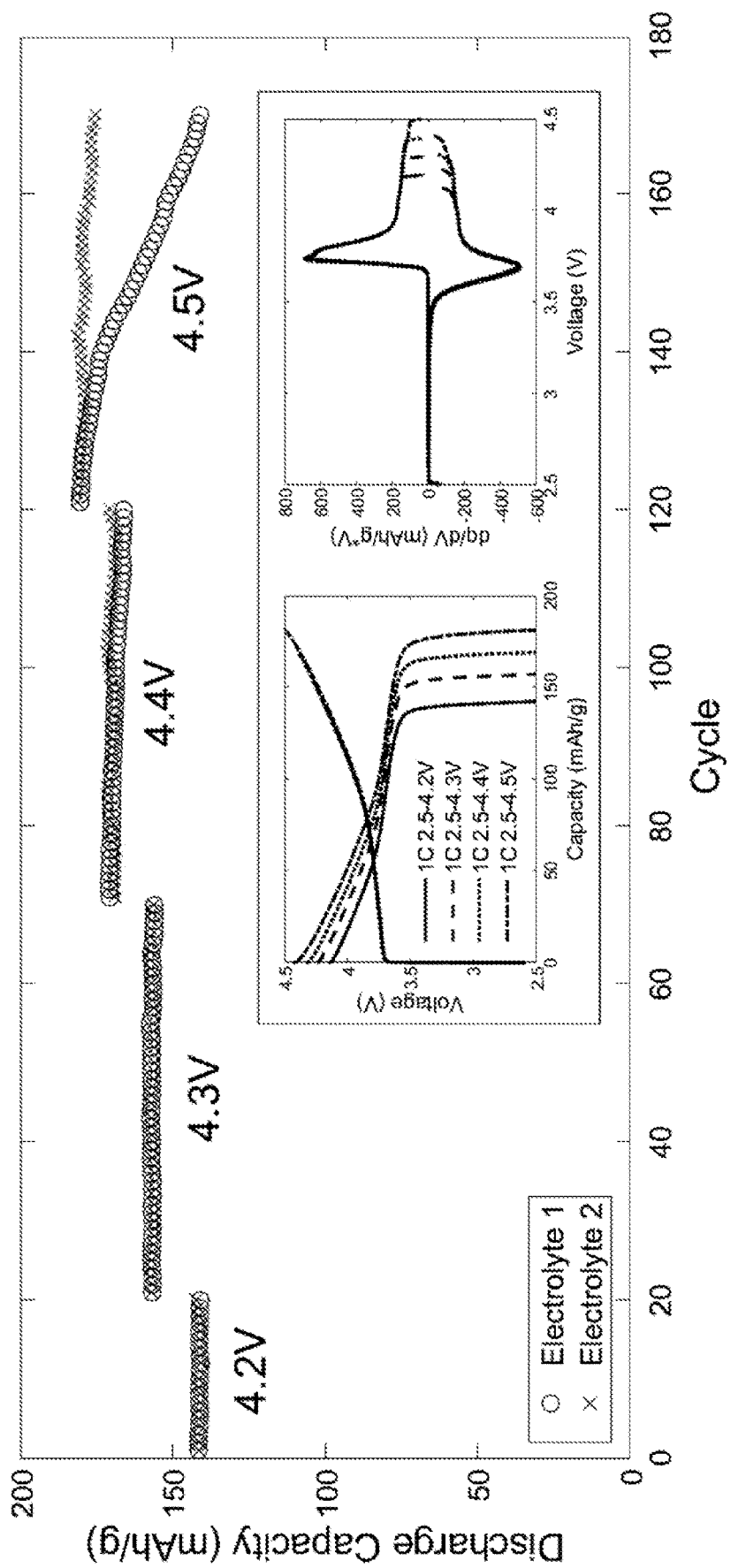

FIG. 6 illustrates the performance of two battery coin cells composed of a lithium metal anode and lithium nickel-manganese-cobalt oxide (NMC622) cathode (the first cell used an electrolyte 1 having 1.0 M LiTFSI and 1.0 M 2-methyl tetrahydrofuran in $CH_3F:CO_2$ in a molar ratio of 9:1, the second cell used an Electrolyte 2 having 1.0 M LiTFSI and 1.0 M triethyl phosphate in $CH_3F:CO_2$ in a molar ratio of 9:1). The inset shows the cycle spectra of Electrolyte 2.

Figure 7:
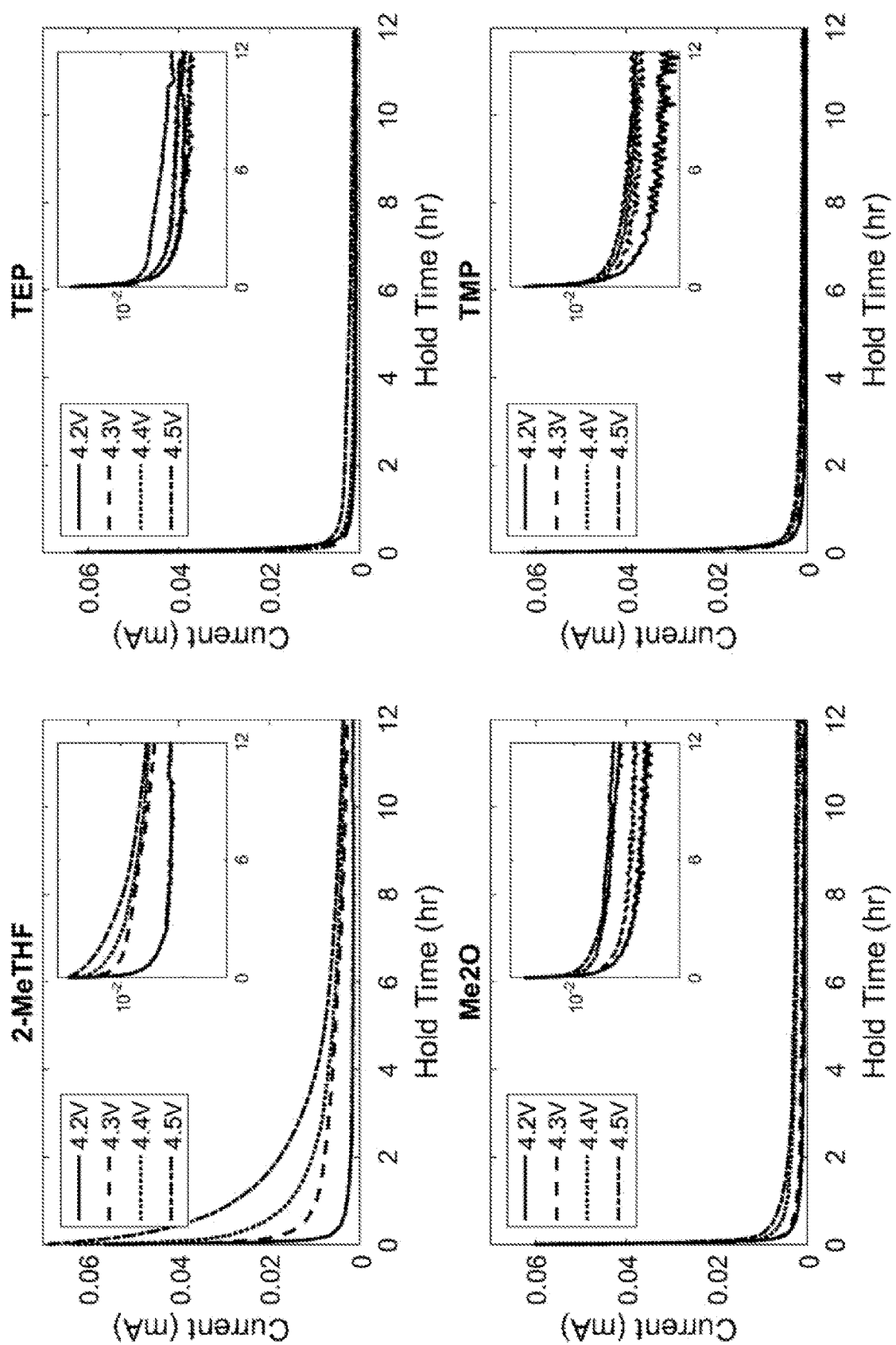

FIG. 7 illustrates the leakage current measurements of coin cells containing four different electrolyte solutions at room temperature. The coin cell was composed of a lithium metal anode and a lithium nickel-manganese-cobalt oxide (NMC622) cathode. The four electrolytes had 1.0 M LiTFSI salt and 1.0 M additive in a mixture of $CH_3F$ and $CO_2$ in a molar ration of 9 to 1. The four additives tested were 2Me-tetrahydrofuran, dimethyl ether, trimethyl phosphate, and triethyl phosphate.

6.0 DETAILED DESCRIPTION

Reference is made herein to some specific examples of the present invention, including any best modes contemplated by the inventor for carrying out the invention. Examples of these specific embodiments are illustrated in the accompanying figures. While the invention is described in conjunction with these specific embodiments, it will be understood that they are not intended to limit the invention to the described or illustrated embodiments. To the contrary, they are intended to cover alternatives, modifications, and equivalents as may be included within the spirit and scope of the invention as defined by the appended claims.

In the following description, numerous specific details are set forth in order to provide a thorough understanding of the present invention. Particular example embodiments of the present invention may be implemented without some or all of these specific details. In other instances, process operations well-known to persons of skill in the art have not been described in detail so as not to obscure unnecessarily the present invention. Various techniques and mechanisms of the present invention will sometimes be described in singular form for clarity. However, it should be noted that some embodiments include multiple iterations of a technique or multiple mechanisms, unless noted otherwise. Similarly, various steps of the methods shown and described herein are not necessarily performed in the order indicated, or performed at all, in certain embodiments. Accordingly, some implementations of the methods discussed herein may include more or fewer steps than those shown or described. Further, the techniques and mechanisms of the present invention will sometimes describe a connection, relationship or communication between two or more entities. It should be noted that a connection or relationship between entities does not necessarily mean a direct, unimpeded connection, as a variety of other entities or processes may reside or occur between any two entities. Consequently, an indicated connection does not necessarily mean a direct, unimpeded connection, unless otherwise noted.

It is known that certain additives may increase the solubility of salts in liquefied gas solvents. These additives have typically been ether or nitrile based (see PCT/US2019/032414). However, it has been shown through study of these additives inside an electrochemical device the voltage stability of a cell is lowered due to unforeseen decomposition of such additives. Further, these additives are highly flammable and may contribute to potential fire and safety hazards. Lastly, some salts are seen to be less soluble with these ethers or nitrile-based additives and require a higher molar ratio of additive for salt to solubilize. For example, while 1M THF in fluoromethane will fully solubilize 1M LiTFSI, it will not fully solubilize $LiPF_6$ or LiFSI type salts. It is highly preferable to find high voltage stability additives with lower flammability, which may also increase the solubility of a variety of salts with a lower additive-to-salt ratio. It is also critical that the additive solubilizes the salt and forms a uniform solution in the liquefied gas electrolyte with no phase separation to maintain a high performance electrolyte.

It is found through considerable experimentation of a variety of additives that the disclosed additives meet the above requirements. For instance, trimethyl phosphate is surprisingly shown to maintain a high voltage stability when used in a cell as an electrolyte additive. While individual electrolyte components might show a certain voltage stability, mixing components into a complete electrolyte can often times change the voltage stability characteristics. It is thus only through experimentation that one can determine the voltage stability of an electrolyte mixture, and it is impressive to see that trimethyl phosphate maintains a very high voltage stability, as shown in FIG. 7. It is also seen that these phosphates solubilize a variety of salts with a lower additive-to-salt ratio. This indicates that the binding of the lithium cation in the liquified gas solvent is strong, and not as much additive is required to dissolve a given salt type or quantity of salt. Further, triethyl phosphate considerably reduces the flammability of the disclosed liquefied gas electrolyte solutions. Finally, it is shown that solutions with trimethyl phosphate and lithium-based salts in fluoromethane are uniformly dispersed, with no phase separation. This is critical to the proper operation of a battery device. Previously it has been seen that phase separation can occur in electrolytes with various liquefied gas solvents. Only in electrolytes in which the additives have both good binding to the salt as and good miscibility with the solvent does phase separation not occur over a wide temperature range. It would not have been obvious previously to those skilled in the art that phosphate-type compounds (ex., trimethyl phosphate or triethyl phosphate) maintain these highly desirable qualities without experimentation, formation and study of these electrolyte compositions inside battery devices.

One embodiment is an electrochemical device comprising an ionically conducting electrolyte and having one or more additives. The ionically conducting electrolyte may comprise one or more salts. The one or more additives may be liquid, solid, or gas at a standard room temperature of +20° C. and at a standard pressure (approximately 1.01325 bar). The one or more salts may be liquid, solid, or gas at a standard room temperature of +20° C. and at a standard pressure (approximately 1.01325 bar).

The ionically conducing electrolyte of the preceding paragraph may also comprise a solution of one or more solvents. The one or more solvents may be selected from the group consisting of liquefied gas solvents, liquid solvents, or solid solvents. One of skill in the art will understand the term "solid solvent" as referring to a solvent that is solid at room temperature and can form a liquid solution when mixed with other liquid or liquids. In some embodiments, the solution of one or more solvents may be a solution of one or more liquefied gas solvents. Each liquefied gas solvent solution is in a liquid-only phase, or in a combined gas-and-liquid phase at a standard room temperature of +20° C. and at a standard pressure (approximately 1.01325 bar) while inside a mechanically rigid container housing the electrolyte. Because of the nature of the high vapor pressure electrolyte, some liquid component of the electrolyte may turn into a vapor component, if the volume within the electrolyte housing allows. One or more liquid components may mix with one or more vapor components in equal or unequal ratio in both liquid and vapor states. This ratio of mixing may occur at any temperature or pressure. While any single component of a liquefied gas solvent may have a vapor pressure above an atmospheric pressure at room temperature, the mixture of any number of liquefied gas solvents, any number of additives, any number of solvents, and any number of salts may also lower the vapor pressure of the full solution to below an atmospheric pressure at room temperature. The solution of one or more liquefied gas solvents may have a vapor pressure above or below an atmospheric pressure at room temperature.

The ionically conducting electrolyte may further comprise one or more additives (or additive components). The one or more additive components may be liquid, solid, or gas at a standard room temperature of +20° C. and at a standard pressure (approximately 1.01325 bar). In one embodiment, the additive comprises trimethyl phosphate in equal molar ratio to the salt in a liquefied gas solvent solution, such as fluoromethane with a LiTFSI salt. In another embodiment, the additive comprises trimethyl phosphate in a molar ratio of 2 to 1 of additive to lithium hexafluorophosphate (LiPF6) salt.

Some such embodiments of electrochemical devices may further comprise a housing, enclosing the ionically conducting electrolyte and structured to provide a pressurized condition to the one or more salts and to the solution of one or more solvents, such as liquefied gas solvents, and a pair of electrodes in contact with the ionically conducting electrolyte.

In some embodiments, the ionically conducting electrolyte may comprise lithium bis(trifluoromethanesulfonyl)imide (LiTFSI) salt. Such an ionically conducting electrolyte may comprise a solution of one or more liquefied gas solvents, comprising fluoromethane, difluoromethane, carbon dioxide, sulfuryl fluoride, or a combination thereof. In some such embodiments, the ionically conducting electrolyte may comprise one or more additives selected from the group consisting of organophosphates. In some embodiments, the electrochemical device is an electrochemical energy storage device as described in PCT/US2014/066015, PCT/US2017/029821, PCT/US2019/032413, and PCT/US2019/032414, which are incorporated by reference in their entireties. In some embodiments, the electrochemical device is a rechargeable battery or an electrochemical capacitor. In some embodiments, the rechargeable battery may be a lithium ion battery or a lithium metal battery. In some other embodiments, the battery is a sodium battery, magnesium battery, an aluminum battery, a potassium battery, or a zinc battery. In other embodiments, the cell is an electrochemical capacitor device or a hybrid capacitor device.

One of skill in the art will understand that the terms "one or more salts," "one or more solvents" (including "liquefied gas solvents" and "liquid solvents"), and "one or more additives," as used herein in connection with "the ionically conducting electrolytes," refer to one or a plurality of electrolyte components.

In some embodiments, the ionically conducting electrolyte can be composed of solvents and salts, wherein the solvents further comprise of only materials which are gaseous under standard conditions. In some embodiments, the materials include fluoromethane, difluoromethane and carbon dioxide. In some embodiments, additional additives are used that provide a beneficial use as it relates to improved salt solubility, to improved voltage stability, or to lower flammability. Embodiments relate to material additives, which increase the solubility of an electrolyte salt component. Without such additives, the solubility of the salt may be limited. However, some additives to which increased salt solubility are observed may show lower voltage stability. High voltage stability is preferable to maximize the energy contained within a cell device. It is also preferred that additives also have a lower flammability component. Here, additives may be treated as an additional component to the overall solvent solution. Additives may also limit the electrolytic conductivity of the electrolyte solutions. Selecting certain additives that show good solubility results in a high electrolytic conductivity, which would improve the performance of the cell device.

Disclosed here are additives that may be used in liquefied gas electrolytes to improve salt solubility, electrolyte conductivity, and voltage stability. In some embodiments, the additives are used in combination with fluoromethane or difluoromethane as a primary solvent and lithium based salts. In some embodiments, other liquefied gas solvents such as fluoromethane, difluoromethane, trifluoromethane, fluoroethane, tetrafluoroethane, pentafluoroethane, 1,1-difluoroethane, 1,2-difluoroethane, 1,1,1-trifluoroethane, 1,1,2-trifluoroethane, 1,1,1,2-tetrafluoroethane, 1,1,2,2-tetrafluoroethane, pentafluoroethane, chloromethane, chloroethane, thionyl fluoride, thionyl chloride fluoride, phosphoryl fluoride, phosphoryl chloride fluoride, sulfuryl fluoride, sulfuryl chloride fluoride, 1-fluoropropane, 2-fluoropropane, 1,1-difluoropropane, 1,2-difluoropropane, 2,2-fluoropropane, 1,1,1-trifluoropropane, 1,1,2-trifluoropropane, 1,2,2-trifluoropropane, fluoroethylene, cis-1,2-fluoroethylene, 1,1-fluoroethylene, 1-fluoropropylene, 2-propylene, chlorine, chloromethane, bromine, iodine, ammonia, methyl amine, dimethyl amine, trimethyl amine, molecular oxygen, molecular nitrogen, carbon monoxide, carbon dioxide, sulfur dioxide, dimethyl ether, methyl vinyl ether, difluoro ethylene, nitrous oxide, nitrogen dioxide, nitrogen oxide, carbon disulfide, hydrogen fluoride, hydrogen chloride or any combination thereof may also be used as liquefied gas solvent in combination with these additives. In some embodiments, the liquefied gas solvents can be difluoromethane. In some embodiments, the liquefied gas solvent can be chloromethane. In some embodiments, the liquefied gas solvent can be fluoromethane. In some embodiments, the liquefied gas solvent can be 1,1-difluoroethane. In some embodiments, the liquefied gas solvent can be sulfuryl fluoride. In some embodiments, the liquefied gas solvent can be thionyl chloride or thionyl fluoride. In some embodiments, the liquefied gas solvent can be selected from the group consisting of: fluoromethane, difluoromethane, sulfuryl fluoride, chloromethane, carbon dioxide, 1,1-difluoroethane and any combination thereof. In some embodiments, the liquefied gas electrolyte includes a single liquefied gas solvent or a combination of liquefied gas solvent and one or more additives and/or one or more salts. These additives may be gaseous, liquid or solid at a standard room temperature of +20° C. and at a standard pressure (approximately 1.01325 bar). Further, any of the gaseous additives may also be used as a primary solvent. In some embodiments, the amount of the primary solvent or mixture of primary solvents is greater than about 10%, about 20%, about 30%, about 40%, about 50%, about 60%, about 70%, about 80%, about 90%, about 95%, about 98%, or about 99% by weight based on the total weight of the liquefied gas electrolyte. In some embodiments, the amount of the primary solvent is less than about 99%, about 98%, about 95%, about 90%, about 80%, about 70%, about 60%, about 50%, about 40%, about 30%, or about 20% by weight based on the total weight of the liquefied gas electrolyte. In some embodiments, the amount of the additive is less than about 80%, about 70%, about 60%, about 50%, about 40%, about 30%, about 20%, about 10%, about 5%, about 2%, or about 1% by weight based on the total weight of the liquefied gas electrolyte.

In some embodiments, the liquefied gas solvents comprise two solvents. In some embodiments, the liquefied gas solvents comprise three solvents. In some embodiments, the liquefied gas solvents comprise four or more solvents. In some embodiments, the liquefied gas solvents comprise fluoromethane, sulfuryl fluoride, and carbon dioxide. In some embodiments, the liquefied gas solvents comprise fluoromethane and carbon dioxide. In some embodiments, the liquefied gas solvents comprise difluoromethane and carbon dioxide. In some embodiments, the liquefied gas solvents comprise sulfuryl fluoride and carbon dioxide. In some embodiments, the liquefied gas electrolyte comprises of fluoromethane, difluoromethane, and carbon dioxide. In some embodiments, the liquefied gas solvents comprise halogenated hydrocarbon and sulfuryl halide. In some embodiments, the liquefied gas solvents comprise halogenated hydrocarbon, sulfuryl halide, and carbon dioxide. In some embodiments, the molar ratio of the additive to the salt is greater than about 0.01, about 0.05, about 0.1, about 0.2, about 0.30, about 0.5, about 0.7, about 0.9, about 0.95, about 0.98, about 1.0, about 1.05, about 1.1, about 1.5, about 2, about 3, about 5, about 10, or about 100. In some embodiments, having a lower molar concertation additive as compared to salt, such as about 0.9, about 0.95, or about 0.98 may be favorable in order to guarantee that the majority of additive material in the electrolyte generally is binding or coordinated to an ion in the electrolyte, thus increasing electrochemical stability of the cell. It is important to note that any additive or solvent molecules that are bound to the salt generally experience an increase in voltage stability from the interaction with salt, which enhances overall cell performance. Thus, it is important to ensure binding of the additives to the salt by properly managing molar ratios between the two in the electrolyte solution. In some embodiments, the molar ratio of the additive to the salt is less than 0.8, 0.85, 0.9, 0.95, 0.98, 0.99, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9. 3.0. In some embodiments, the molar ratio of the additive to the salt is less than about 0.8, about 0.85, about 0.9, about 0.95, about 0.98, about 0.99, about 1.0, about 1.1, about 1.2, about 1.3, about 1.4, about 1.5, about 1.6, about 1.7, about 1.8, about 1.9, about 2.0, about 2.1, about 2.2, about 2.3, or about 2.4. In some embodiments, the molar ratio of the additive to the salt is in the range of about 0.5 to about 1.0, about 0.8 to about 0.98, about 0.9 to about 1.0, about 0.9 to about 0.98, about 1 to about 1.5, about 1.5 to about 2, about 2 to about 2.5, about 1.9 to about 2.1, or about 2 to about 2.2. In some embodiments, having a higher molar concentration of additive to salt, such as a ratio of about 1.1, about 1.2, or about 2.0 may be favorable in order to guarantee maximum solubility of salt for improved performance. In some embodiments, multiple additives are used, each of which may have a molar ratio to the salt that is greater than about 0.01, about 0.05, about 0.1, about 0.2, about 0.30, about 0.5, about 0.7, about 0.9, about 0.95, about 0.98, about 1.0, about 1.05, about 1.1, about 1.5, about 2, about 3, about 5, about 10, or about 100. In some embodiments, the salt concentration in the electrolyte solution is greater than about 0.1, about 0.3, about 0.5, about 0.8, about 1.0, about 1.3, about 1.5, about 1.8, about 2.0, about 3.0, about 4.0, about 5.0, or about 8.0 moles per liter of solution.

In some embodiments, the liquefied gas electrolyte can include one or more additives. In some embodiments, the liquefied gas electrolyte can include one additive. In some embodiments, the liquefied gas electrolyte can include two or more additives. In some embodiments, the additive can be a noncyclic carbonate, a cyclic carbonate, a non-cyclic ether, a cyclic ether, a nitrile compound, an organophosphate, or any combination thereof. In some embodiments, the one or more additives comprises trimethyl phosphate. In another embodiment, the one or more additives comprises triethyl phosphate.

In one embodiment, the additive may be of an organophosphate compound,

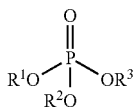

where R1, R2, R3 may be groups consisting of any of hydrogen, fluorine, methyl, ethyl, propyl, butyl, pentyl, hexyl, phenyl, allyl, dimethylamide, diethylamide, and any combination thereof.

In an exemplary electrochemical device using a liquefied gas electrolyte composed of one or more liquefied gas components with any combination of one or more liquid components, one or more solid components, or one or more salt components, the electrodes are composed of any combination of two electrodes of intercalation type such as graphite, carbon, activated carbon, lithium titanate, titanium disulfide, molybdenum disulfide, lithium iron phosphate, lithium cobalt phosphate, lithium nickel phosphate, lithium cobalt oxide, lithium nickel manganese oxide, lithium nickel manganese cobalt oxide, lithium nickel cobalt aluminum oxide or chemical reaction electrode such as with chemicals of sulfur, oxygen, carbon dioxide, nitrogen, nitrous oxide, sulfur dioxide, thionyl fluoride, thionyl chloride fluoride, sulfuryl fluoride, sulfuryl chloride fluoride or of a metallic electrode with lithium, sodium, magnesium, tin, aluminum, zinc metal or metal alloy including lithium, sodium, tin, magnesium, aluminum, zinc, or any combination thereof. These components may be combined with various binder polymer components, including polyvinylidene fluoride, carboxymethyl cellulose, styrene-butadiene rubber, or polytetrafluoroethylene in order to maintain structural integrity of the electrode.

Further, the one or more liquefied gas solvent solution or electrolyte may be combined with one or more salts, including one or more of lithium bis(trifluoromethanesulfonyl) imide (LiTFSI), lithium hexafluorophosphate (LiPF6), lithium perchlorate (LiClO4), lithium hexafluoroarsenate (LiAsF6), lithium tetrachloroaluminate (LiAlCl4), lithium tetragaliumaluminate, lithium bis(oxalato)borate (LiBOB), lithium hexafluorostannate, lithium difluoro(oxalato)borate (LiDFOB), lithium bis(fluorosulfonyl)imide (LiFSI), lithium aluminum fluoride (LiAlF3), lithium nitrate (LiNO3), lithium chloroaluminate, lithium tetrafluoroborate (LiBF4), lithium tetrachloroaluminate, lithium difluorophosphate, lithium tetrafluoro(oxalato)phosphate, lithium difluorobis(oxalato)phosphate, lithium borate, lithium oxolate, lithium thiocyanate, lithium tetrachlorogallate, lithium chloride, lithium bromide, lithium iodide, lithium carbonate, lithium fluoride, lithium oxide, lithium hydroxide, lithium nitride, lithium super oxide, lithium azide, lithium deltate, di-lithium squarate, lithium croconate dihydrate, dilithium rhodizonate, lithium oxalate, di-lithium ketomalonate, lithium di-ketosuccinate or any corresponding salts with the positive charged lithium cation substituted for sodium or magnesium or any combinations thereof. Further useful salts include those with positively charged cations such as tetramethylammonium, tetraethylammonium, tetrapropylammonium, tetrabutylammonium, triethylmethylammonium ammonium, spiro-(1,1')-bipyrrolidinium, 1,1-dimethylpyrrolidinium, and 1,1-diethylpyrrolidinium, N,N-diethyl-N-methyl-N-(2-methoxyethyl)ammonium, N,N-Diethyl-N-methyl-N-propylammonium, N,N-dimethyl-N-ethyl-N-(3-methoxypropyl)ammonium, N,N-Dimethyl-N-ethyl-N-benzylAmmonium, N,N-Dimethyl-N-ethyl-N-phenylethylammonium, N-Ethyl-N,N-dimethyl-N-(2-methoxyethyl)ammonium, N-Tributyl-N-methylammonium, N-Trimethyl-N-hexylammonium, N-Trimethyl-N-butylammonium, N-Trimethyl-N-propylammonium, 1,3-Dimethylimidazolium, 1-(4-Sulfobutyl)-3-methylimidazolium, 1-Allyl-3H-imidazolium, 1-Butyl-3-methylimidazolium, 1-Ethyl-3-methylimidazolium, 1-Hexyl-3-methylimidazolium, 1-Octyl-3-methylimidazolium, 3-Methyl-1-propylimidazolium, H-3-Methylimidazolium, Trihexyl(tetradecyl)phosphonium, N-Butyl-N-methylpiperidinium, N-Propyl-N-methylpiperidinium, 1-Butyl-1-Methylpyrrolidinium, 1-Methyl-1-(2-methoxyethyl) pyrrolidinium, 1-Methyl-1-(3-methoxypropyl) pyrrolidinium, 1-Methyl-1-octylpyrrolidinium, 1-Methyl-1-pentylpyrrolidinium, or N-methylpyrrolidinium paired with negatively charged anions such as acetate, bis(fluorosulfonyl)imide, bis(oxalate)borate, bis(trifluoromethanesulfonyl) imide, bromide, chloride, dicyanamide, diethyl phosphate, hexafluorophosphate, hydrogen sulfate, iodide, methanesulfonate, methyl-phophonate, tetrachloroaluminate, tetrafluoroborate, and trifluoromethanesulfonate.

6.1 EXAMPLE 1

Figure 1:
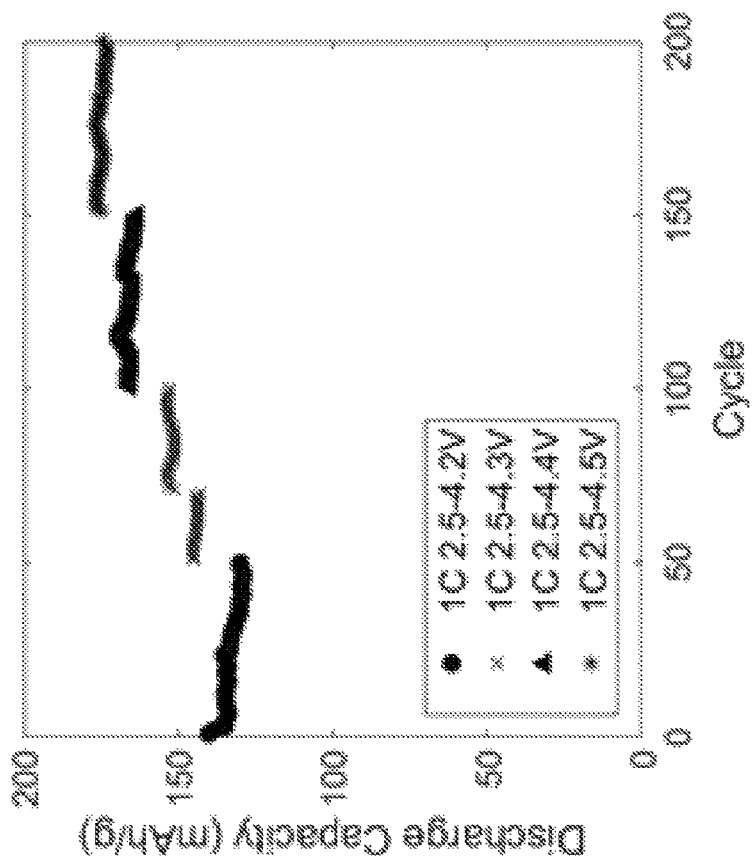
FIG. 1 illustrates the performance of a battery coin cell using a lithium metal anode, a lithium nickel-cobalt-manganese oxide (NMC622) cathode and an electrolyte composed of 1.0 M LiTFSI, 1.0 M triethylphosphate in $CH_3F:CO_2$ with a molar ratio of 9:1.
Figure 1:
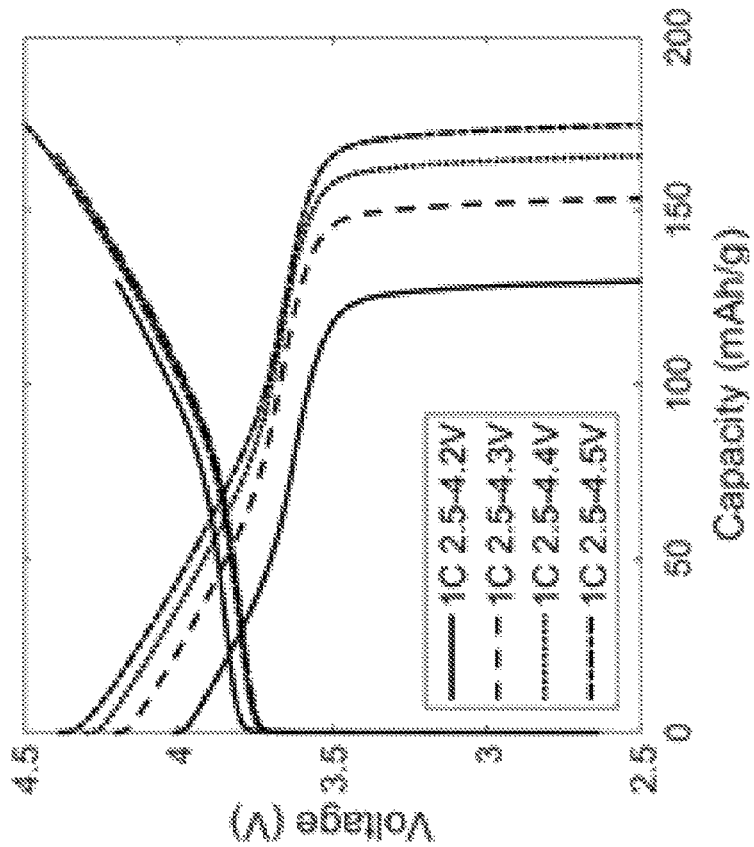

A battery coin cell composed of a lithium metal anode and a lithium nickel-manganese-cobalt oxide (NMC622) cathode was assembled. An electrolyte used 1.0 M LiTFSI and 1.0 M triethylphosphate (TEP) in a mixture of fluoromethane (CH3F) and carbon dioxide (CO2) in a molar ration of 9 to 1. The cell was cycled at the 1-C rate to various charge voltages of 4.2, 4.3, 4.4, 4.5 V. Cell performance is shown in FIG. 1.

6.2 EXAMPLE 2

Figure 2:
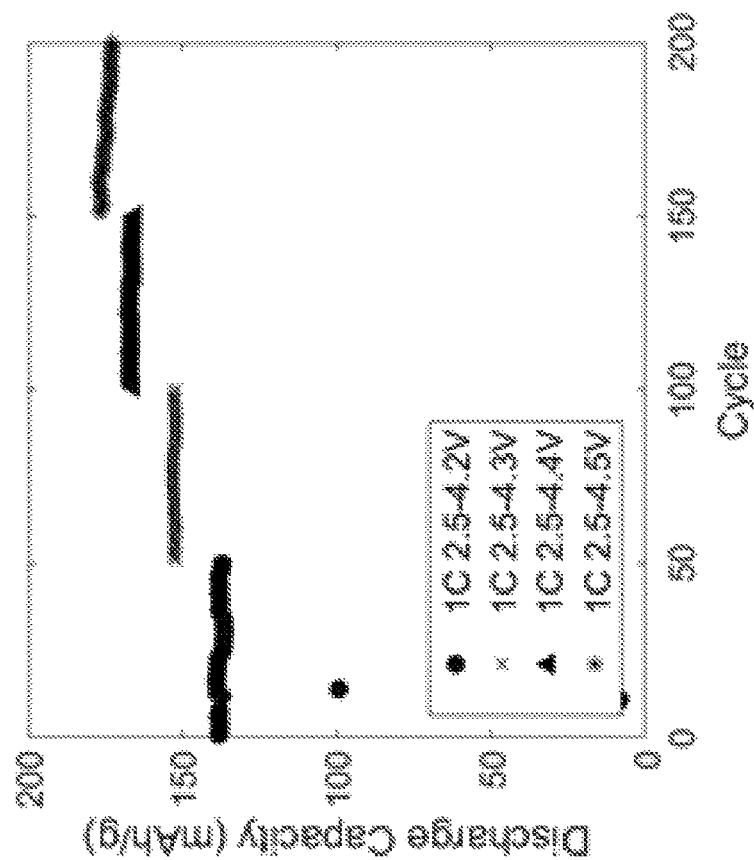
FIG. 2 illustrates the performance of a battery coin cell using a lithium metal anode, a lithium nickel-cobalt-manganese oxide (NMC622) cathode and an electrolyte composed of 1.0 M LiFSI, 1.2 M triethylphosphate in $CH_3F:CO_2$ with a molar ratio of 9:1.
Figure 2:
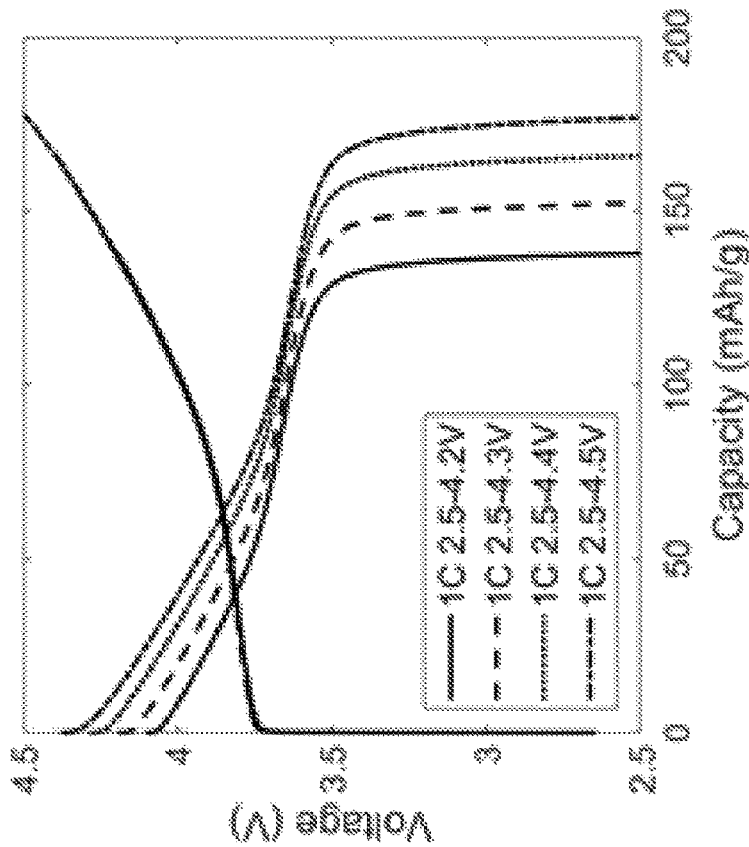

A battery coin cell composed of a lithium metal anode and lithium nickel-manganese-cobalt oxide (NMC622) cathode was assembled. An electrolyte used 1.0 M LiFSI and 1.2 M triethyl phosphate (TEP) in a mixture of CH3F and CO2 in a molar ration of 9 to 1. The cell was cycled at the 1-C rate to various charge voltages of 4.2, 4.3, 4.4, 4.5 V. Cell performance is shown in FIG. 2.

6.3 EXAMPLE 3

Figure 3:
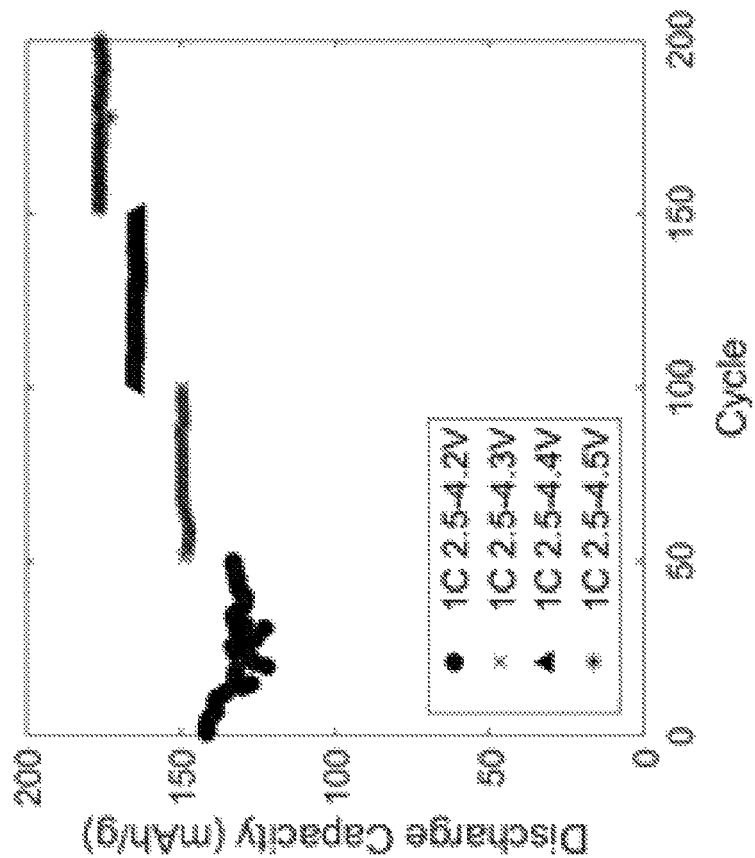
FIG. 3 illustrates the performance of a battery coin cell using a lithium metal anode, a lithium nickel-cobalt-manganese oxide (NMC622) cathode and an electrolyte composed of 1.0 M LiTFSI, 1.0 M trimethylphosphate in $CH_3F:CO_2$ with a molar ratio of 9:1.
Figure 3:
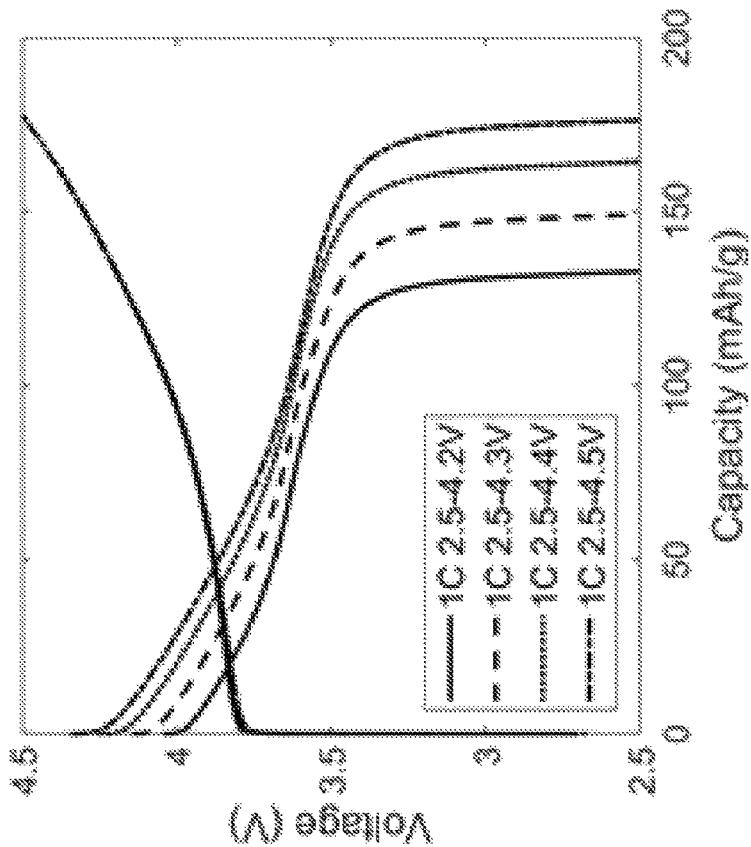

A battery coin cell composed of a lithium metal anode and lithium nickel-manganese-cobalt oxide (NMC622) cathode was assembled. An electrolyte used 1.0 M LiTFSI and 1.0 M trimethylphosphate (TMP) in a mixture of fluoromethane (CH3F) and carbon dioxide (CO2) in a molar ration of 9 to 1. The cell was cycled at the 1-C rate to various charge voltages of 4.2, 4.3, 4.4, 4.5 V. Cell performance is shown in FIG. 3.

6.4 EXAMPLE 4

Electrolytic conductivity measurements were made on three electrolyte solutions. Electrolyte solution 1 contained 1.0 M LiTFSI and 1.0 M triethyl phosphate (TEP) in fluoromethane (CH3F, FM). Electrolyte solution 2 contained 1.0 M LiTFSI and 1.0 M trimethyl phosphate (TMP) in fluoromethane (CH3F, FM). Electrolyte solution 3 contained 1.0 M LiTFSI and 1.0 M 2-methyl tetrahydrofuran (2MeTHF) in fluoromethane (CH3F, FM). The solutions containing the organophosphate additives were superior in conductivity to the 2MeTHF additive, as shown in FIG. 4.

6.5 EXAMPLE 5

Electrolyte pressure measurements were made on three electrolyte solutions. Electrolyte solution 1 contained 1.0 M LiTFSI and 1.0 M triethyl phosphate (TEP) in fluoromethane (CH3F, FM). Electrolyte solution 2 contained 1.0 M LiTFSI and 1.0 M trimethyl phosphate (TMP) in fluoromethane (CH3F, FM). Electrolyte solution 3 contained 1.0 M LiTFSI and 1.0 M 2-methyl tetrahydrofuran (2MeTHF) in fluoromethane (CH3F, FM). It is seen that the mixture of salt and additive had little influence on the overall pressure of the liquefied gas electrolyte solution between different electrolytes or the pure fluoromethane solvent. Pressure data is shown in FIG. 5.

6.6 EXAMPLE 6

Two battery coin cells composed of a lithium metal anode and a lithium nickel-manganese-cobalt oxide (NMC622) cathode were assembled. The first cell used an Electrolyte 1 having 1.0 M LiTFSI and 1.0 M 2-methyl tetrahydrofuran in CH3F:CO2 in a molar ratio of 9:1. The second cell used an Electrolyte 2 having 1.0 M LiTFSI and 1.0 M triethyl phosphate in CH3F:CO2 in a molar ratio of 9:1. The cells were cycled at the 1-C rate to various charge voltages of 4.2, 4.3, 4.4, 4.5 V. There is a clear degradation of capacity for Electrolyte 1 due to the lower stability of this additive. Electrolyte 2 remains stable at even high charge voltages. Cell performance data is shown in FIG. 6.

6.7 EXAMPLE 7

Four coin cells using different electrolytes were assembled, and leakage current was measured as a function of voltage at room temperature. A higher leakage current indicates faster decomposition, or poor voltage stability, of the electrolyte additive. The coin cell was composed of a lithium metal anode and a lithium nickel-manganese-cobalt oxide (NMC622) cathode. The four electrolytes had 1.0 M LiTFSI salt and 1.0 M additive in a mixture of CH3F and CO2 in a molar ration of 9 to 1. The four additives tested were 2Me-tetrahydrofuran, dimethyl ether, trimethyl phosphate, and triethyl phosphate. Performance of these cells is shown in FIG. 7. It is unexpectedly found that trimethyl phosphate and triethyl phosphate have superior stability at increased voltages of 4.4 and 4.5 V, whereas the ether-based additives had poor stability at these voltages. This surprising result can only be determined from experimentation, since there is no way to derive this high voltage stability through theory or modeling. It is through the combination of the liquefied gas solvents and the additives that a unique chemistry is formed that creates a surface-electrolyte-interphase (SEI) on the cathode surface, which allows for very impressive stability even at high voltages. The low leakage current further reinforces this fact. Both FIGS. 6 and 7 reinforce these findings. These unexpected results with the phosphate compound additives are far superior to the previously disclosed ether-type additives.

6.8 EXAMPLE 8

Stainless steel cells with glass windows were assembled which contain various electrolytes. The windows allow one to see the solubility of salts in various electrolyte formulations. Table 1 below presents observed solubility for various electrolytes. It is unexpectedly found that trimethyl phosphate and triethyl phosphate have superior solubility for various salts in fluoromethane. It is important to note that there are frequent phase separations in various combinations of liquefied gas solvents, additives, and salts. An ideal additive will show good affinity or binding for a salt and high miscibility with the solvent system. These unique combinations will generally yield a mixture that has high solubility for salts and no phase separation over a wide range of temperatures. In contrast, the ethers and carbonates tested with various salts do not show this unique combination of properties. The unexpected performance of the phosphate compounds can only be determined through experimentation, which led to these surprising findings.

TABLE 1

| OBSERVED SOLUBILITY | | | | | |
|---|---|---|---|---|---|
| All in fluoromethane based liquefied gas solvent at +20° C. | | | | | |
| Additive Concentration | Additive | Salt Concentration | Salt | Primary Solvent | Solubility |
| 1.0M | Tetrahydrofuran | 1.0M | LiTFSI | Fluoromethane | Soluble, no phase separation |
| 1.0M | Tetrahydrofuran | 1.0M | LiFSI | Fluoromethane | Soluble, with phase separation |
| 1.0M | Fluoroethylene carbonate | 1.0M | LiFSI | Fluoromethane | Soluble, with phase separation |
| 1.0M | Trimethyl phosphate | 1.0M | LiFSI | Fluoromethane | Soluble, no phase separation |
| 1.0M | Triethyl phosphate | 1.0M | LiFSI | Fluoromethane | Soluble, phase separation |
| 1.5M | Dimethyl ether | 1.0M | LiPF6 | Fluoromethane | Not soluble |
| 1.5M | Trimethyl phosphate | 1.0M | LiPF6 | Fluoromethane | Soluble, no phase separation |
| 1.0M | Tetrahydrofuran | 1.0M | LiTFSI | Difluoromethane | Not soluble |
| 2.0M | Fluoroethylene carbonate | 1.0M | LiFSI | Difluoromethane | Soluble, with phase separation |
| 2.0M | Dimethyl ether | 1.0M | LiPF6 | Difluoromethane | Not soluble |

TABLE 1-continued

OBSERVED SOLUBILITY
All in fluoromethane based liquefied gas solvent at +20° C.

| Additive Concentration | Additive | Salt Concentration | Salt | Primary Solvent | Solubility |
|---|---|---|---|---|---|
| 2.0M | Trimethyl phosphate | 1.0M | LiPF6 | Difluoromethane | Soluble, no phase separation |
| 1.5M | Triethyl phosphate | 1.0M | LiFSI | Difluoromethane | Soluble, no phase separation |
| 1.0M | Trimethyl phosphate | 1.0M | LiTFSI | Difluoromethane | Soluble, no phase separation |

Although exemplary embodiments and applications of the invention have been described herein including as described above and shown in the included example Figures, there is no intention that the invention be limited to these exemplary embodiments and applications or to the manner in which the exemplary embodiments and applications operate or are described herein. Indeed, many variations and modifications to the exemplary embodiments are possible as would be apparent to a person of ordinary skill in the art. The invention may include any device, structure, method, or functionality, as long as the resulting device, system or method falls within the scope of one of the claims that are allowed by the patent office based on this or any related patent application.

The invention claimed is:

1. A battery device, comprising:
an ionically conducting electrolyte comprising a mixture of a compressed gas solvent and one or more lithium salts, wherein the compressed gas solvent comprises at least a first component that has a vapor pressure above 100 kPa at a room temperature of 293.15 K, and wherein the first component is selected from the group consisting of: fluoromethane, difluoromethane, trifluoromethane, fluoroethane, 1,1 difluoroethane, trifluoroethane, tetrafluoroethane, and pentafluoroethane isomers thereof;
a housing enclosing the ionically conducting electrolyte under a pressurized condition that maintains the compressed gas solvent at a pressure higher than 100 kPa at a room temperature of 293.15 K;
an anode and a cathode in contact with the ionically conducting electrolyte; and
one or more additives selected from the group consisting of: trimethyl phosphate and triethyl phosphate.

2. The battery device of claim 1, wherein the molar ratio of the one or more additives to the one or more lithium salts is in the range from about 0.01 to about 10.

3. The battery device of claim 1, wherein the anode is selected from a group consisting of: graphite, carbon, activated carbon, and lithium titanate, and wherein the cathode is selected from the group consisting of: titanium disulfide, molybdenum disulfide, lithium iron phosphate, lithium cobalt phosphate, lithium nickel phosphate, lithium cobalt oxide, lithium nickel manganese oxide, lithium nickel manganese cobalt oxide, and lithium nickel cobalt aluminum oxide.

4. The battery device of claim 1, wherein the anode is comprised of one or more of: lithium metal, sodium metal, magnesium metal, aluminum metal, and zinc metal.

5. The battery device of claim 1, wherein the lithium salt is composed of LiTFSI, LiFSI, LiPF6, LiBOB, LiBF4, LiDFOB, LiNO3, or any combination thereof.

6. The battery device of claim 1, wherein the device is a lithium battery.

* * * * *

UNITED STATES PATENT AND TRADEMARK OFFICE
CERTIFICATE OF CORRECTION

PATENT NO. : 11,088,396 B2
APPLICATION NO. : 17/006850
DATED : August 10, 2021
INVENTOR(S) : Rustomji et al.

It is certified that error appears in the above-identified patent and that said Letters Patent is hereby corrected as shown below:

In the Claims

At Column 13, Lines 39-40 the text "tetrafluoroethane, and pentafluoroethane isomers thereof;" is amended to read "tetrafluoroethane, pentafluoroethane and isomers thereof;"

Signed and Sealed this
Fifth Day of September, 2023

Katherine Kelly Vidal
*Director of the United States Patent and Trademark Office*